(12) United States Patent
Moore (10) Patent No.: US 9,625,990 B2
(45) Date of Patent: Apr. 18, 2017

(54) VISION-ASSIST SYSTEMS INCLUDING USER EYE TRACKING CAMERAS

(71) Applicant: Toyota Motor Engineering & Manufacturing North America, Inc., Erlanger, KY (US)

(72) Inventor: Douglas A. Moore, Livermore, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 240 days.

(21) Appl. No.: 14/636,475

(22) Filed: Mar. 3, 2015

(65) Prior Publication Data

US 2016/0259410 A1 Sep. 8, 2016

(51) Int. Cl.
G06F 3/01 (2006.01)
G06K 9/00 (2006.01)
G02B 27/01 (2006.01)

(52) U.S. Cl.
CPC .......... *G06F 3/016* (2013.01); *G02B 27/017* (2013.01); *G06F 3/013* (2013.01); *G06K 9/00288* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ..... G06F 3/016; G06F 3/013; G06K 9/00288; G02B 27/017
USPC .......................................................... 348/62
See application file for complete search history.

(56) References Cited

U.S. PATENT DOCUMENTS

| 5,029,216 A | 7/1991 | Jhabvala et al. |
|---|---|---|
| 6,502,032 B1 | 12/2002 | Newman |
| 8,630,633 B1 | 1/2014 | Tedesco et al. |
| 8,766,765 B2 * | 7/2014 | Hamadallah ........... G02C 11/10 340/4.12 |

(Continued)

OTHER PUBLICATIONS

"Eye Contact", Device helps visually impaired recognize non-verbal communication, SPIE Professional (Jan. 2013), <URL: http://spie.org/x91417.xml>.

(Continued)

*Primary Examiner* — Christopher Findley
(74) *Attorney, Agent, or Firm* — Dinsmore & Shohl LLP (57) ABSTRACT

Vision-assist systems including user eye tracking cameras are disclosed. A vision-assist system includes a processor, a memory module communicatively coupled to the processor, a user eye tracking camera communicatively coupled to the processor, an environment camera communicatively coupled to the processor, a feedback device communicatively coupled to the processor, and machine readable instructions stored in the memory module that, when executed by the processor, cause the vision-assist system to receive environment image data from the environment camera, determine a location of an individual speaking to a user based on the environment image data, receive user eye tracking image data from the user eye tracking camera, determine a pose of the user's eyes based on the user eye tracking image data, and provide feedback to the user with the feedback device based on the location of the individual speaking to the user and the pose of the user's eyes.

19 Claims, 5 Drawing Sheets

(56) References Cited

U.S. PATENT DOCUMENTS

| | | | | |
|---|---|---|---|---|
| 2006/0003803 A1* | 1/2006 | Thomas | ............... | G02C 11/06 |
| | | | | 455/556.1 |
| 2007/0160254 A1* | 7/2007 | Ritter | ................. | G02C 11/06 |
| | | | | 381/381 |
| 2008/0058894 A1* | 3/2008 | Dewhurst | ........... | G09B 21/007 |
| | | | | 607/54 |
| 2008/0151179 A1* | 6/2008 | Howell | ................. | G02C 11/00 |
| | | | | 351/158 |
| 2010/0110368 A1* | 5/2010 | Chaum | ............... | G02B 27/017 |
| | | | | 351/158 |
| 2010/0145729 A1 | 6/2010 | Katz | | |
| 2016/0142830 A1* | 5/2016 | Hu | ....................... | G02C 11/06 |
| | | | | 434/185 |
| 2016/0309081 A1* | 10/2016 | Frahm | ................... | G06F 3/013 |

OTHER PUBLICATIONS

Sreekar Krishna, Dirk Colbry, John Black, Vineeth Balasubramanian, Sethuraman Panchanathan. "A Systematic Requirements Analysis and Development of an Assistive Device to Enhance the Social Interaction of People Who are Blind or Visually Impaired. Workshop on Computer Vision Applications for the Visually Impaired", Oct. 2008, Marseille, France. <URL: https://hal.inria.fr/inria-00325432/document>.

\* cited by examiner

VISION-ASSIST SYSTEMS INCLUDING USER EYE TRACKING CAMERAS

TECHNICAL FIELD

The present specification generally relates to vision-assist systems and, more specifically, to vision-assist systems including user eye tracking cameras.

BACKGROUND

It may be difficult for a visually impaired individual to orient his or her gaze in the direction of a person speaking with the visually impaired individual. Similarly, it may be difficult for a visually impaired individual to gain and maintain eye contact with a person speaking with the visually impaired individual. Such difficulties may impair social interaction for the visually impaired user.

Accordingly, a need exists for vision-assist systems that assist a visually impaired user with orienting his or her gaze in the direction of a person speaking with the visually impaired user, assist a visually impaired user with gaining and maintaining eye contact with a person speaking with the visually impaired user, improve and allow social interactions that are currently difficult or not possible for visually impaired individuals, and/or provide a reminder of posture and etiquette during social interactions.

SUMMARY

In one embodiment, a vision-assist system includes a processor, a memory module communicatively coupled to the processor, a user eye tracking camera communicatively coupled to the processor, an environment camera communicatively coupled to the processor, a feedback device communicatively coupled to the processor, and machine readable instructions stored in the memory module. The machine readable instructions, when executed by the processor, cause the vision-assist system to receive environment image data from the environment camera, determine a location of an individual speaking to a user based on the environment image data, receive user eye tracking image data from the user eye tracking camera, determine a pose of the user's eyes based on the user eye tracking image data, and provide feedback to the user with the feedback device based on the location of the individual speaking to the user and the pose of the user's eyes.

In another embodiment, a vision-assist system includes an eyeglass module. The eyeglass module includes an eyeglass frame, and a user eye tracking camera mechanically coupled to the eyeglass frame. The vision-assist system further includes a processor communicatively coupled to the user eye tracking camera, a memory module communicatively coupled to the processor, an environment camera communicatively coupled to the processor, a feedback device communicatively coupled to the processor, and machine readable instructions stored in the memory module. The machine readable instructions, when executed by the processor, cause the vision-assist system to: receive environment image data from the environment camera, determine a location of an individual speaking to a user based on the environment image data, receive user eye tracking image data from the user eye tracking camera, determine a pose of the user's eyes based on the user eye tracking image data, and provide feedback to the user with the feedback device based on the location of the individual speaking to the user and the pose of the user's eyes.

In yet another embodiment, a vision-assist system includes an eyeglass module. The eyeglass module includes an eyeglass frame, a user eye tracking camera mechanically coupled to the eyeglass frame, and an environment camera mechanically coupled to the eyeglass frame. The vision-assist system further includes a processor communicatively coupled to the user eye tracking camera and communicatively coupled to the environment camera, a memory module communicatively coupled to the processor, a feedback device wirelessly communicatively coupled to the eyeglass module, and machine readable instructions stored in the memory module. The machine readable instructions, when executed by the processor, cause the vision-assist system to: receive environment image data from the environment camera, determine a location of an individual speaking to a user based on the environment image data, receive user eye tracking image data from the user eye tracking camera, determine a pose of the user's eyes based on the user eye tracking image data, and provide feedback to the user with the feedback device based on the location of the individual speaking to the user and the pose of the user's eyes.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 4:
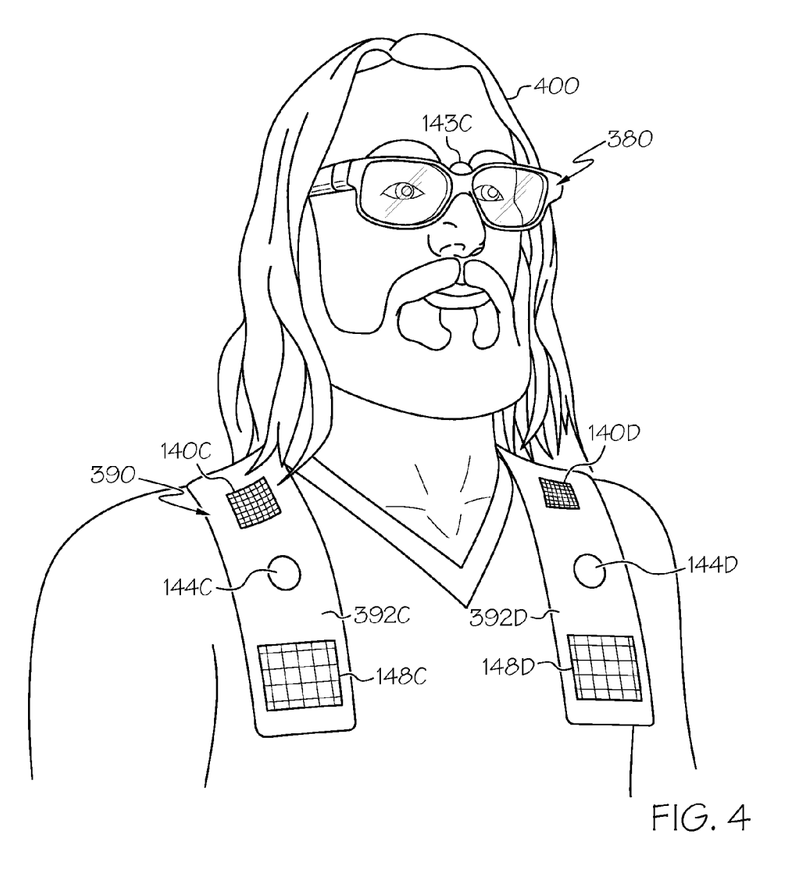
FIG. 4 schematically depicts a perspective view of a user utilizing the vision-assist system to maintain eye contact with an individual speaking with the user, according to one or more embodiments shown and described herein.

The embodiments disclosed herein include vision-assist systems including user eye tracking cameras. Referring generally to FIG. 4, a vision-assist system includes a user eye tracking camera, an environment camera, and a feedback device. The vision-assist system receives environment image data from the environment camera, determines a location of an individual speaking to a user based on the environment image data, receives user eye tracking image data from the user eye tracking camera, determines a pose of the user's eyes based on the user eye tracking image data, and provides feedback to the user with the feedback device based on the location of the individual speaking to the user and the pose of the user's eyes. By providing such feedback to the user, the vision-assist systems described herein assist a visually impaired user with orienting his or her gaze in the direction of a person speaking with the visually impaired user and/or assist a visually impaired user with gaining and maintaining eye contact with a person speaking with the visually impaired user. Furthermore, the vision-assist systems described herein improve and allow social interactions that are currently difficult or not possible for blind and visually impaired individuals. The vision-assist systems described herein may provide a reminder of posture and etiquette during social interactions. The various vision-assist systems including user eye tracking cameras will be described in more detail herein with specific reference to the corresponding drawings.

Figure 1:
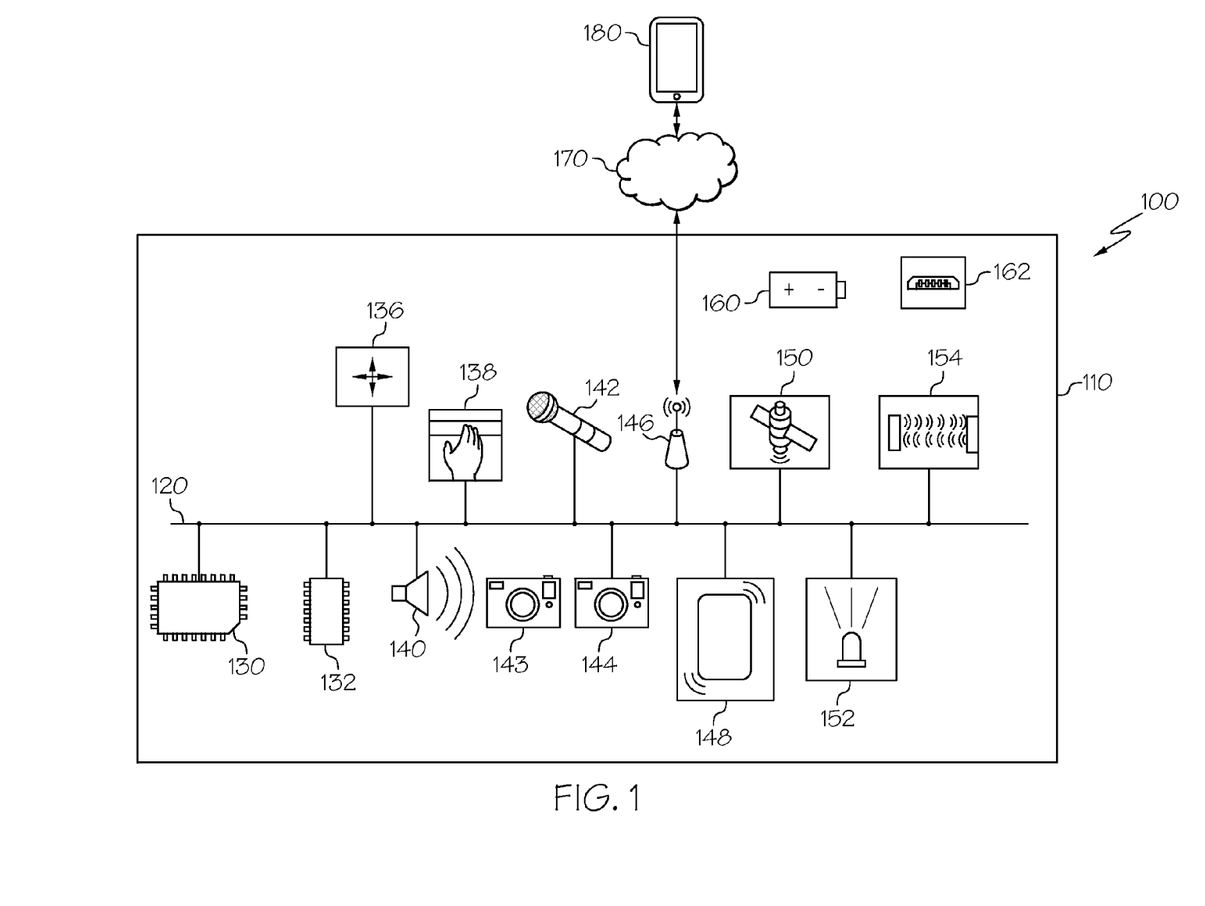
FIG. 1 schematically depicts a vision-assist system including a variety of sensors and electronic components, according to one or more embodiments shown and described herein.

Referring now to FIG. 1, one embodiment of a vision-assist system 100 is schematically depicted. The vision-assist system 100 includes a communication path 120, one or more processors 130, one or more memory modules 132, one or more inertial measurement units 136, tactile input hardware 138, one or more speakers 140, one or more microphones 142, one or more user eye tracking cameras 143, one or more environment cameras 144, network interface hardware 146, one or more tactile feedback devices 148, one or more location sensors 150, one or more lights 152, one or more proximity sensors 154, one or more batteries 160, and one or more charging ports 162. The various components of the vision-assist system 100 and the interaction thereof will be described in detail below.

Still referring to FIG. 1, the communication path 120 may be formed from any medium that is capable of transmitting a signal such as, for example, conductive wires, conductive traces, optical waveguides, or the like. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the vision-assist system 100. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 130 of the vision-assist system 100 may be any device capable of executing machine readable instructions. Accordingly, each of the one or more processors 130 may be a controller, an integrated circuit, a microchip, a computer, or any other computing device. Each of the one or more processors 130 is communicatively coupled to the other components of the vision-assist system 100 by the communication path 120. Accordingly, the communication path 120 may communicatively couple any number of processors with one another, and allow the components coupled to the communication path 120 to operate in a distributed computing environment. Specifically, each of the components may operate as a node that may send and/or receive data.

Each of the one or more memory modules 132 of the vision-assist system 100 is coupled to the communication path 120 and communicatively coupled to the one or more processors 130. Each of the one or more memory modules 132 may comprise RAM, ROM, flash memories, hard drives, or any device capable of storing machine readable instructions such that the machine readable instructions can be accessed and executed by the one or more processors 130. The machine readable instructions may comprise logic or algorithm(s) written in any programming language of any generation (e.g., 1 GL, 2 GL, 3 GL, 4 GL, or 5 GL) such as, for example, machine language that may be directly executed by the one or more processors 130, or assembly language, object-oriented programming (OOP), scripting languages, microcode, etc., that may be compiled or assembled into machine readable instructions and stored in the one or more memory modules 132. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Each of the one or more inertial measurement units 136 is coupled to the communication path 120 and communicatively coupled to the one or more processors 130. Each of the one or more inertial measurement units 136 may include one or more accelerometers and one or more gyroscopes. Each of the one or more inertial measurement units 136 transforms sensed physical movement of the vision-assist system 100 into a signal indicative of an orientation, a rotation, a velocity, or an acceleration of the vision-assist system 100. Some embodiments of the vision-assist system 100 may not include the one or more inertial measurement units 136, such as embodiments that include an accelerometer but not a gyroscope, embodiments that include a gyroscope but not an accelerometer, or embodiments that include neither an accelerometer nor a gyroscope. Some embodiments may not include the one or more inertial measurement units 136.

Still referring to FIG. 1, the tactile input hardware 138 is coupled to the communication path 120 and communicatively coupled to the one or more processors 130. The tactile input hardware 138 may be any device capable of transforming mechanical pressure (e.g, the pressure from a user contacting the tactile input hardware 138) into a data signal that can be transmitted over the communication path 120 such as, for example, a button, a switch, a knob, a microphone or the like. In some embodiments, the tactile input hardware 138 includes a power button, a volume button, an activation button, a scroll button, or the like. In some embodiments, the tactile input hardware 138 includes a pressure sensor, a touch strip, a pressure strip, or the like. Some embodiments may not include the tactile input hardware 138.

Each of the one or more speakers 140 is coupled to the communication path 120 and communicatively coupled to the one or more processors 130. Each of the one or more speakers 140 transforms data signals from the vision-assist system 100 into audible mechanical vibrations. However, it should be understood that in other embodiments the vision-assist system 100 may not include the one or more speakers 140.

Each of the one or more microphones 142 is coupled to the communication path 120 and communicatively coupled to the one or more processors 130. Each of the one or more microphones 142 may be any device capable of transforming a mechanical vibration associated with sound into an electrical signal indicative of the sound. Some embodiments may not include the one or more microphones 142.

Each of the one or more user eye tracking cameras 143 is coupled to the communication path 120 and communicatively coupled to the one or more processors 130. Each of the one or more user eye tracking cameras 143 may be any device having an array of sensing devices (e.g., pixels) capable of detecting radiation in an ultraviolet wavelength band, a visible light wavelength band, or an infrared wavelength band. Each of the one or more user eye tracking cameras 143 may have any resolution. The one or more user eye tracking cameras 143 may include an omni-directional camera, or a panoramic camera. In some embodiments, one or more optical components, such as a mirror, fish-eye lens, or any other type of lens may be optically coupled to at least one of the one or more user eye tracking cameras 143.

Each of the one or more environment cameras 144 is coupled to the communication path 120 and communicatively coupled to the one or more processors 130. Each of the one or more environment cameras 144 may be any device having an array of sensing devices (e.g., pixels) capable of detecting radiation in an ultraviolet wavelength band, a visible light wavelength band, or an infrared wavelength band. Each of the one or more environment cameras 144 may have any resolution. The one or more environment cameras 144 may include an omni-directional camera, or a panoramic camera. In some embodiments, one or more optical components, such as a mirror, fish-eye lens, or any other type of lens may be optically coupled to at least one of the one or more environment cameras 144.

The network interface hardware 146 is coupled to the communication path 120 and communicatively coupled to the one or more processors 130. The network interface hardware 146 may be any device capable of transmitting and/or receiving data via a network 170. Accordingly, the network interface hardware 146 can include a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 146 includes hardware configured to operate in accordance with the Bluetooth wireless communication protocol. In other embodiments, the network interface hardware 146 includes hardware configured to operate in accordance with a wireless communication protocol other than Bluetooth.

Still referring to FIG. 1, in some embodiments, the vision-assist system 100 may be communicatively coupled to a remote electronic device 180 via the network 170. In some embodiments, the network 170 is a personal area network that utilizes Bluetooth technology to communicatively couple the vision-assist system 100 and the remote electronic device 180. In other embodiments, the network 170 may include one or more computer networks (e.g., a personal area network, a local area network, or a wide area network), cellular networks, satellite networks and/or a global positioning system and combinations thereof. Accordingly, the vision-assist system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 may be utilized to communicatively couple the vision-assist system 100 with the remote electronic device 180. The remote electronic device 180 may include a mobile phone, a smartphone, a personal digital assistant, a camera, a dedicated mobile media player, a mobile personal computer, a laptop computer, and/or any other remote electronic device capable of being communicatively coupled with the vision-assist system 100. The remote electronic device 180 may include one or more processors and one or more memories. The one or more processors can execute logic to communicate with the vision-assist system 100. The remote electronic device 180 may be configured with wired and/or wireless communication functionality for communicating with the vision-assist system 100. In some embodiments, the remote electronic device 180 may perform one or more elements of the functionality described herein, such as in embodiments in which the functionality described herein is distributed between the vision-assist system 100 and the remote electronic device 180. In some embodiments, the remote electronic device 180 may provide a user interface through which one or more settings or configurations of the vision-assist system 100 may be altered (e.g., the ability to turn feedback on or off, adjusting the frequency of feedback, adjusting the type of feedback, etc.). In some embodiments, the vision-assist system 100 is not communicatively coupled to a remote electronic device 180.

Still referring to FIG. 1, each of the one or more tactile feedback devices 148 is coupled to the communication path 120 and communicatively coupled to the one or more processors 130. Each of the one or more tactile feedback devices 148 may be any device capable of providing tactile feedback to a user. The one or more tactile feedback devices 148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 148.

Each of the one or more location sensors 150 is coupled to the communication path 120 and communicatively coupled to the one or more processors 130. Each of the one or more location sensors 150 may be any device capable of generating an output indicative of a location. In some embodiments, the one or more location sensors 150 include a global positioning system (GPS) sensor, though embodiments are not limited thereto. Some embodiments may not include the one or more location sensors 150, such as embodiments in which the vision-assist system 100 does not determine a location of the vision-assist system 100 or embodiments in which the location is determined in other ways (e.g., based on information received from the one or more environment cameras 144, the one or more microphones 142, the network interface hardware 146, the one or more proximity sensors 154, the one or more inertial measurement units 136 or the like).

Each of the one or more lights 152 is coupled to the communication path 120 and communicatively coupled to the one or more processors 130. Each of the one or more lights 152 may be any device capable of outputting light, such as but not limited to a light emitting diode, an incandescent light, a fluorescent light, or the like. In some embodiments, the one or more lights 152 include a power indicator light that is illuminated when the vision-assist system 100 is powered on. In some embodiments, the one or more lights 152 includes an activity indicator light that is illuminated when the vision-assist system 100 is active or processing data. In some embodiments, the one or more lights 152 includes an illumination light for illuminating a field proximate the vision-assist system 100 (e.g. for illuminating an area in the field of view of a user of the vision-assist system 100). Some embodiments may not include the one or more lights 152.

Each of the one or more proximity sensors 154 is coupled to the communication path 120 and communicatively coupled to the one or more processors 130. Each of the one or more proximity sensors 154 may be any device capable of outputting a proximity signal indicative of a proximity of the vision-assist system 100 to an individual speaking with a user of the vision-assist system 100. In some embodiments, the one or more proximity sensors 154 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the one or more proximity sensors 154, such as embodiments in which the proximity of the vision-assist system 100 to an individual speaking with a user of the vision-assist system 100 is determine from inputs provided by other sensors (e.g., the one or more environment cameras 144, the one or more speakers 140, etc.) or embodiments that do not determine a proximity of the vision-assist system 100 to an individual speaking with a user of the vision-assist system 100.

The vision-assist system 100 is powered by the one or more batteries 160, each of which is electrically coupled to the various electrical components of the vision-assist system 100. Each of the one or more batteries 160 may be any device capable of storing electric energy for later use by the vision-assist system 100. In some embodiments, the one or more batteries 160 may include a rechargeable battery, such as a lithium-ion battery or a nickel-cadmium battery. In embodiments in which the one or more batteries 160 include a rechargeable battery, the vision-assist system 100 may include the one or more charging ports 162, each of which may be used to charge the one or more batteries 160. Some embodiments may not include the one or more batteries 160, such as embodiments in which the vision-assist system 100 is powered by solar energy or energy harvested from the environment. Some embodiments may not include the one or more charging ports 162, such as embodiments in which the vision-assist system 100 utilizes disposable batteries for power.

It should be understood that the components of the vision-assist system 100 (including, but not limited to the one or more processors 130, the one or more memory modules 132, the one or more inertial measurement units 136, the tactile input hardware 138, the one or more speakers 140, the one or more microphones 142, the one or more user eye tracking cameras 143, the one or more environment cameras 144, the network interface hardware 146, the one or more tactile feedback devices 148, the one or more location sensors 150, the one or more lights 152, the one or more proximity sensors 154, the one or more batteries 160, and the one or more charging ports 162) may be distributed among a variety of physical modules, each of which are communicatively coupled via a wireless network or a wired network. For example, in some embodiments described below, the components of the vision-assist system 100 may be distributed among an eyeglass module, a necklace, and/or an earpiece, each of which may be wirelessly communicatively coupled or communicatively coupled via one or more wires. Furthermore, while the vision-assist system 100 depicted in FIG. 1 includes the one or more tactile feedback devices 148 and the one or more speakers 140 as possible feedback devices communicatively coupled to the one or more processors 130, embodiments are not limited thereto. In other embodiments, a feedback device other than the one or more tactile feedback devices 148 or the one or more speakers 140 may provide feedback to a user of the vision-assist system 100, such as in embodiments that provide feedback with a display module, or any other device capable of providing feedback to the user.

Figure 2:
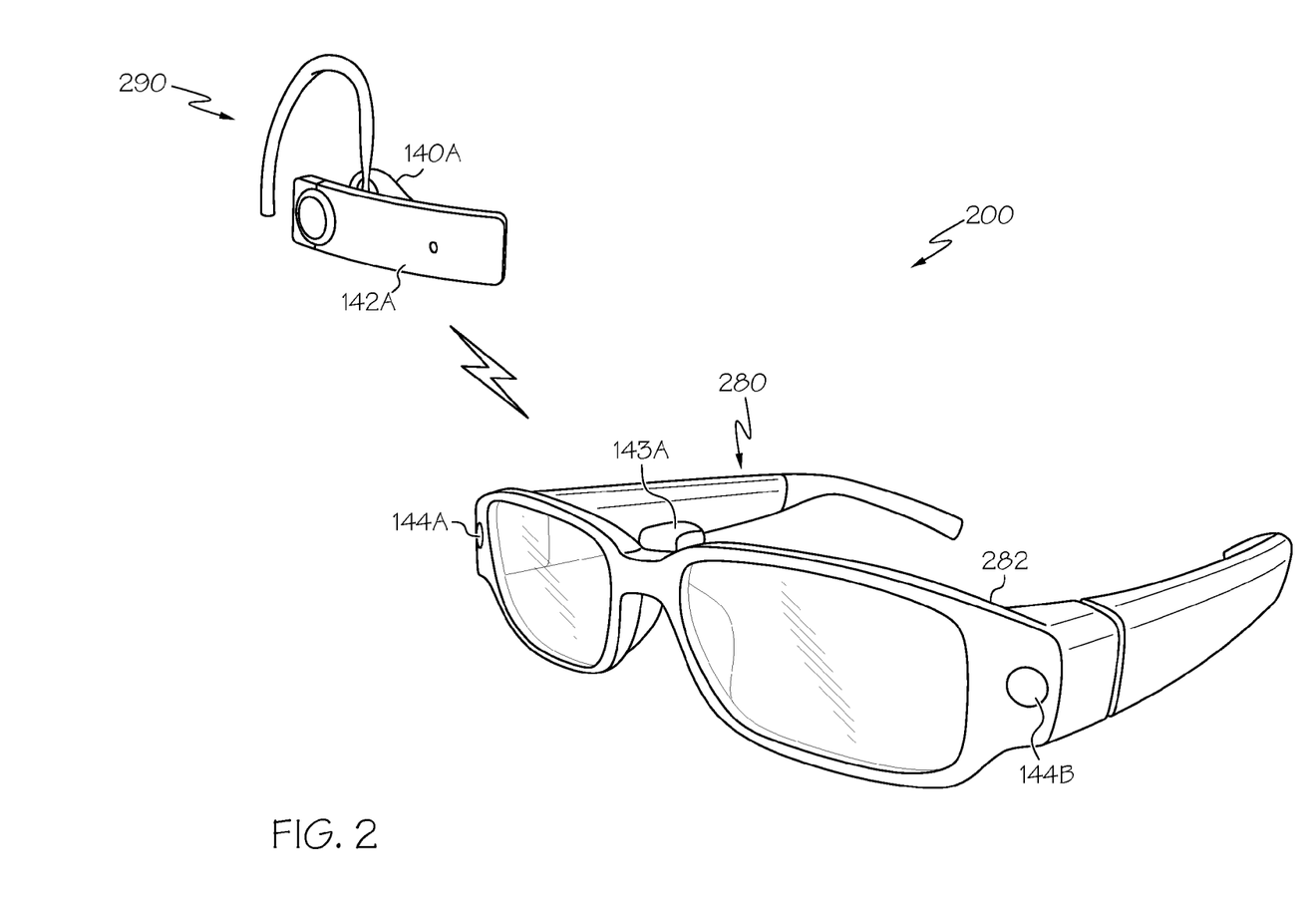
FIG. 2 schematically depicts a perspective view of a vision-assist system including an eyeglass module and an earpiece module, according to one or more embodiments shown and described herein.

Referring now to FIG. 2, a perspective view of a vision-assist system 200 is schematically depicted. The vision-assist system 200 includes an eyeglass module 280 and an earpiece module 290. The eyeglass module 280 includes an eyeglass frame 282, a user eye tracking camera 143A, a first environment camera 144A, and a second environment camera 144B. The user eye tracking camera 143A is included in the one or more user eye tracking cameras 143 described above with reference to FIG. 1. The first environment camera 144A and the second environment camera 144B are included in the one or more environment cameras 144 described above with reference to FIG. 1.

Still referring to the eyeglass module 280 depicted in FIG. 2, the eyeglass frame 282 is operable to be worn by a user in the manner of a conventional eyeglass frame. The user eye tracking camera 143A is mechanically coupled to a central interior portion of the eyeglass frame 282. The first environment camera 144A is mechanically coupled to a first exterior end of the eyeglass frame 282. The second environment camera 144B is mechanically coupled to a second exterior end of the eyeglass frame 282. While the eyeglass module 280 depicted in FIG. 2 includes one user eye tracking camera 143A, other embodiments may include more than one user eye tracking camera. Likewise, while the eyeglass module 280 depicted in FIG. 2 includes the first environment camera 144A and the second environment camera 144B, other embodiments may include only a single environment camera or more than two environment cameras. Some embodiments may not include an environment camera, such as embodiments in which the environment camera is coupled to a remote computing device that is wirelessly communicatively coupled to the eyeglass module 280. In some embodiments, at least one of the one or more processors 130 and at least one of the one or more memory modules 132 (described above with reference to FIG. 1) are mechanically coupled to the eyeglass frame 282.

Still referring to FIG. 2, the earpiece module 290 is wirelessly communicatively coupled to the eyeglass module 280 (though in other embodiments the earpiece module 290 may be communicatively coupled to the eyeglass module 280 by one or more wires). In embodiments in which the earpiece module 290 is wirelessly communicatively coupled to the eyeglass module 280, both the earpiece module 290 and the eyeglass module 280 include network interface hardware operable to wirelessly communicate information between the eyeglass module 280 and the earpiece module 290. In other embodiments, the earpiece module 290 is integrated with the eyeglass module 280.

Still referring to the earpiece module 290 depicted in FIG. 2, the earpiece module 290 includes a microphone 142A and a speaker 140A, each of which are wirelessly communicatively coupled to the eyeglass module 280. The earpiece module 290 is configured to be worn around the ear of a user. The speaker 140A is included in the one or more speakers 140 described above with reference to FIG. 1. The speaker 140A is configured to be inserted into the user's ear and produces the audible messages described herein. The microphone 142A is included in the one or more microphones 142 described above with reference to FIG. 1. The microphone 142A may serve s a user input device for inputting information (e.g., voice controls) into the vision-assist system 200. In some embodiments, the microphone 142A may receive a mechanical vibration associated with sound from an individual speaking with the user into an electrical signal, which may be used by the vision-assist system 200 to determine the location of the individual, as will be described further below.

Figure 3:
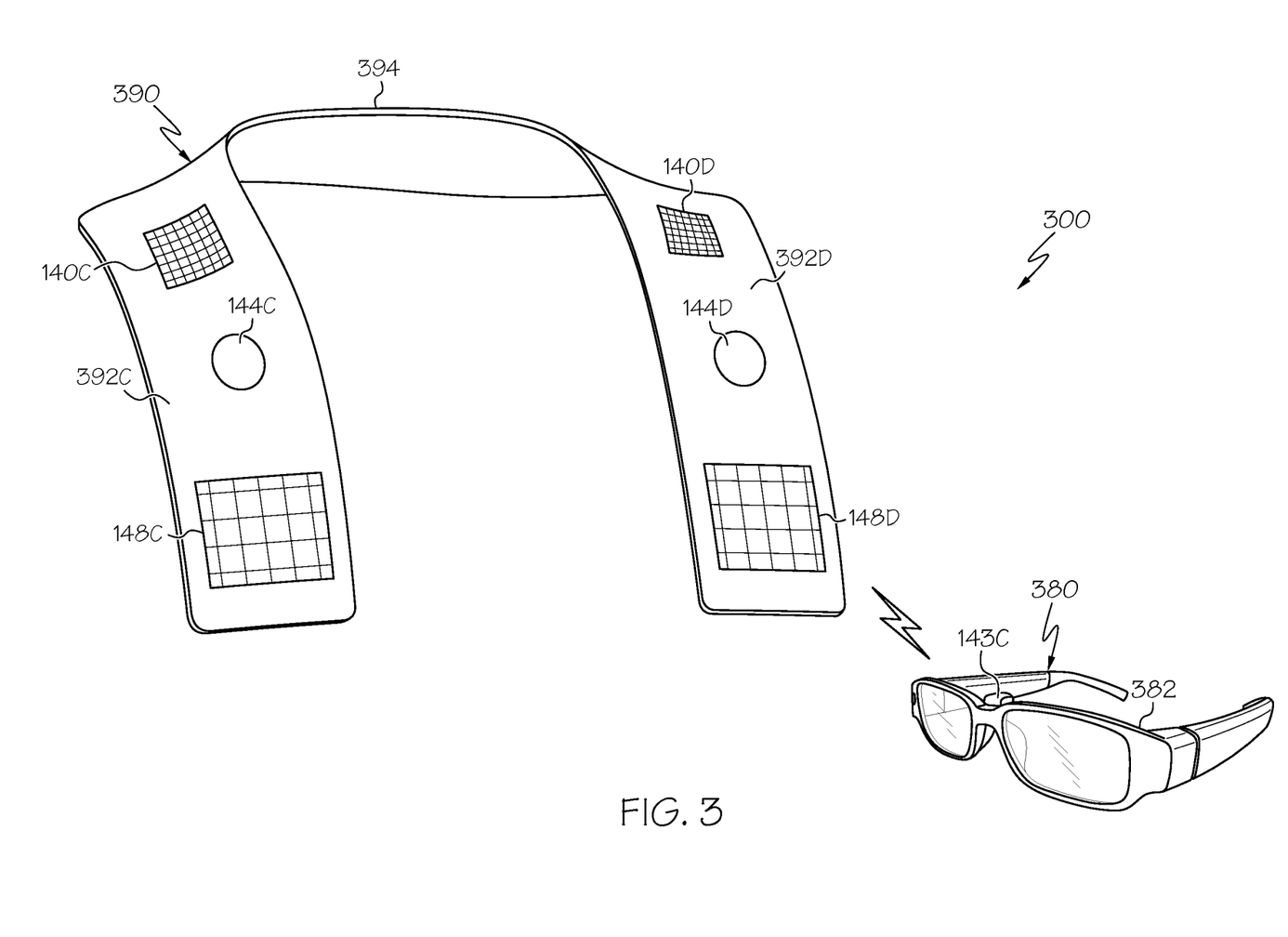
FIG. 3 schematically depicts a perspective view of a vision-assist system including an eyeglass module and a necklace module, according to one or more embodiments shown and described herein.

Referring now to FIG. 3, a perspective view of a vision-assist system 300 is schematically depicted. The vision-assist system 300 includes an eyeglass module 380 and a necklace module 390. The eyeglass module 380 includes an eyeglass frame 382 and a user eye tracking camera 143C. The user eye tracking camera 143C is included in the one or more user eye tracking cameras 143 described above with reference to FIG. 1. The eyeglass frame 382 is operable to be worn by a user in the manner of a conventional eyeglass frame. The user eye tracking camera 143C is mechanically coupled to a central interior portion of the eyeglass frame 382. While the eyeglass module 380 depicted in FIG. 3 includes one user eye tracking camera 143C, other embodiments may include more than one user eye tracking camera. In some embodiments, at least one of the one or more processors 130 and at least one of the one or more memory modules 132 (described above with reference to FIG. 1) are mechanically coupled to the eyeglass frame 382.

Still referring to FIG. 3, the necklace module 390 is wirelessly communicatively coupled to the eyeglass module 380 (though in other embodiments the necklace module 390 may be communicatively coupled to the eyeglass module 380 by one or more wires). In embodiments in which the necklace module 390 is wirelessly communicatively coupled to the eyeglass module 380, both the necklace module 390 and the eyeglass module 380 include network interface hardware operable to wirelessly communicate information between the eyeglass module 380 and the necklace module 390.

Still referring to the necklace module 390 depicted in FIG. 3, the necklace module 390 has a necklace configuration intended to be worn around the neck of the user. The necklace module 390 includes a neck portion 394, a first chest portion 392C, and a second chest portion 392D. It should be understood that the necklace module 390 may be configured differently than what is illustrated in FIG. 3, and that the necklace module 390 may take on different shapes and sizes in other embodiments.

Still referring to the necklace module 390 depicted in FIG. 3, the necklace module 390 includes a first environment camera 144C, a second environment camera 144D, a first speaker 140C, a second speaker 140D, a first tactile feedback device 148C, and a second tactile feedback device 148D, each of which are wirelessly communicatively coupled to the eyeglass module 380. The first environment camera 144C is mechanically coupled to the first chest portion 392C. The second environment camera 144D is mechanically coupled to the second chest portion 392D. The first environment camera 144C and the second environment camera 144D are included in the one or more environment cameras 144 described above with reference to FIG. 1. While the necklace module 390 depicted in FIG. 3 includes the first environment camera 144C and the second environment camera 144D, other embodiments may include only a single environment camera or multiple environment cameras.

Still referring to FIG. 3, the first speaker 140C is mechanically coupled to the first chest portion 392C. The second speaker 140D is mechanically coupled to the second chest portion 392D. The first speaker 140C and the second speaker 140D are included in the one or more speakers 140 described above with reference to FIG. 1. While the necklace module 390 depicted in FIG. 3 includes the first speaker 140C and the second speaker 140D, other embodiments may include only a single speaker.

Still referring to FIG. 3, the first tactile feedback device 148C is mechanically coupled to the first chest portion 392C. The second tactile feedback device 148D is mechanically coupled to the second chest portion 392D. The first tactile feedback device 148C and the second tactile feedback device 148D are included in the one or more tactile feedback devices 148 described above with reference to FIG. 1. While the necklace module 390 depicted in FIG. 3 includes the first tactile feedback device 148C and the second tactile feedback device 148D, other embodiments may include only a single tactile feedback device.

Some embodiments of the necklace module 390 may not include a speaker, may not include an environment camera and/or may not include a tactile feedback device. For example, some embodiment that only provide feedback with a speaker may not include a tactile feedback device. Conversely, some embodiments that only provide feedback with a tactile feedback device may not include a speaker.

While the eyeglass module 280 and the eyeglass module 380 depicted in FIG. 2 and FIG. 3, respectively, do not include a feedback device mechanically coupled to the eyeglass frame 282, in some embodiments an eyeglass module includes one or more feedback devices mechanically coupled to the eyeglass frame, such as in embodiments in which the eyeglass module includes a speaker of the one or more speakers 140 and/or a tactile feedback device of the one or more tactile feedback devices 148.

Figure 5:
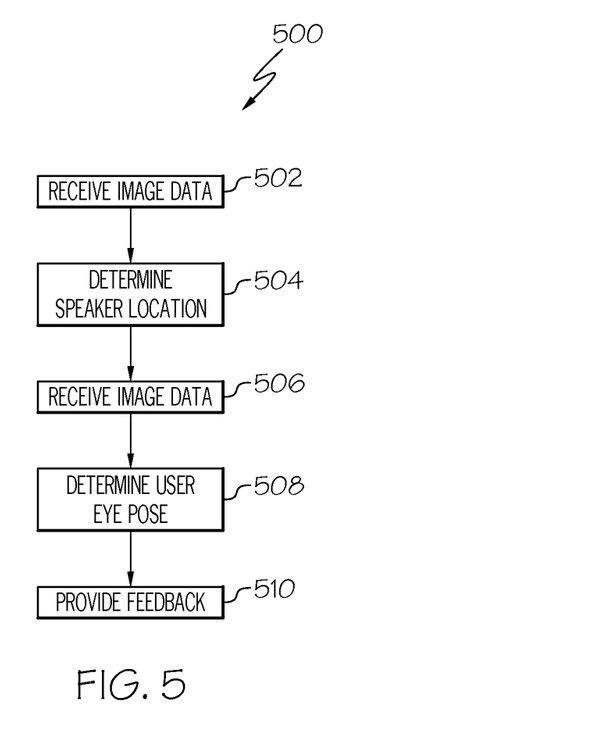
FIG. 5 schematically depicts a flowchart of a method of providing feedback to a user of a vision-assist system, according to one or more embodiments shown and described herein.

Having described the hardware and components of various vision-assist systems, a method of providing feedback to a visually-impaired user using a vision-assist system will now be provided with reference to FIGS. 4 and 5.

Referring to FIG. 4, a user 400 may utilize a vision-assist system including the eyeglass module 380 and the necklace module 390 (described above with reference to FIG. 3) when speaking with a person 450. As will be appreciated from the below description, the vision-assist system may help the user 400 to orient his gaze in the direction of the person 450 while conversing with the person 450, and may help the user 400 to maintain eye contact with the person 450 while conversing with the person 450.

Referring now to FIG. 5, a flowchart of a method 500 of providing feedback to the user 400 (FIG. 4) is schematically depicted. At block 502, the vision-assist system receives environment image data from the one or more environment cameras 144. In the scene depicted in FIG. 4, the vision-assist system receives environment image data (incluidng an image of the person 45) from the first environment camera 144C and the second environment camera 144D.

Still referring to FIG. 5, at block 504, the vision-assist system determines a location of an individual speaking to a user based on the environment image data received at block 502. In the scene depicted in FIG. 4, the vision-assist system determines a location of the person 450 based on the environment image data. In some embodiments, the vision-assist system determines a location of the individual's eyes based on the environment image data, and further determines the location of the individual based on the location of the individual's eyes. Any facial recognition algorithm or image processing algorithm may be capable of recognizing the eyes of an individual speaking to the user. Once the individual's eyes are recognized, the system may determine a location of the individual speaking to the user based on the relative position of the recognized eyes to other features of the environment image data. For example, in the scene depicted in FIG. 4, the vision-assist system determines a location of the eyes of the person 450 and determines the location of the person 450 based on the eye location.

Still referring to block 504 of FIG. 5, in some embodiments, the vision-assist system recognizes a moving mouth in the received environment image data and further determines a location of the individual speaking to the user based on the recognized moving mouth. Any facial recognition algorithm or image processing algorithm may be capable of recognizing a moving mouth in a sequence of received image data. For example, in the scene depicted in FIG. 4, the vision-assist system recognizes a moving mouth of the person 450 and determines the location of the person 450 based on the recognized moving mouth.

In some embodiments, the vision-assist system recognizes a face in the received environment image data using a facial recognition algorithm, and further determines a location of the individual speaking to the user based on the recognized face. Any facial recognition algorithm or image processing algorithm may be capable of recognizing a face in received image data. For example, in the scene depicted in FIG. 4, the vision-assist system recognizes a face of the person 450 and determines the location of the person 450 based on the recognized face.

In some embodiments in which the vision-assist system includes the one or more microphones 142, the one or more microphones 142 may receive a mechanical vibration associated with sound from an individual speaking with the user into an electrical signal, which may be used by the vision-assist system, along with the environment image data, to determine the location of the individual. Some embodiments may also use input from the one or more inertial measurement units 136, the one or more location sensors 150, and/or the one or more proximity sensors 154 to determine the location of the individual speaking with the user.

Still referring to FIG. 5, at block 506, the vision-assist system receives user eye tracking image data from the one or more user eye tracking cameras 143. At block 508, the vision-assist system determines a pose of the user's eyes based on the user eye tracking image data received at block 506. Any facial recognition algorithm or image processing algorithm may be capable of recognizing the pose of the user's eyes.

Still referring to FIG. 5, at block 510, the vision-assist system provides feedback to the user with the feedback device based on the location of the individual speaking to the user (determined at block 504) and the pose of the user's eyes (determined at block 508). In some embodiments that include the one or more speakers 140, the vision-assist system provides audible feedback to the user with the one or more speakers 140 based on the location of the individual speaking to the user and the pose of the user's eyes. For example, if the vision-assist system determines that the user 400 (FIG. 4) should move his or her eyes to the left, the one or more speakers may output an audible command to "move left." Similarly, the vision-assist system may output audible commands to "move right," "move up," or "move down" when the system determines that the user's eyes should be moved right, up, or down, respectively. In some embodiments that include the one or more tactile feedback devices 148, the vision-assist system provides tactile feedback to the user with the one or more tactile feedback devices based on the location of the individual speaking to the user and the pose of the user's eyes. For example, referring to FIG. 4, the first tactile feedback device 148C may be activated to indicate that the user 400 should turn his head or eyes to his right, and the second tactile feedback device 148D may be activated to indicate that the user 400 should turn his head or eyes to his left. In some embodiments, the tactile feedback devices may be activated in different patterns or with different frequencies to indicate various commands (e.g., whether to move the user's head or eyes up, down, left, or right. In some embodiments that determine a location of the individual's eyes based on the environment image data, the vision-assist system provides feedback with the feedback device based on the location of the individual's eyes. In some embodiments that determine a location of a moving mouth based on the environment image data, the vision-assist system provides feedback with the feedback device based on the location of the moving mouth. In some embodiments that recognize a face in the received environment image data using a facial recognition algorithm, the vision-assist system provides feedback with the feedback device based on the recognized face.

While the embodiments depicted and described herein include a user eye tracking camera that is separate from an environment camera, embodiments are not limited thereto. In some embodiments, a single camera may be used to track the user's eyes and to monitor the environment for the location of the individual speaking to the user, such as when optics, mirrors, are the like are employed in the optical path between the camera and the user's eyes and/or the environment.

It should be understood that embodiments described herein are directed to vision-assist systems including user eye tracking cameras. The vision-assist systems described herein receive environment image data from the environment camera, determine a location of an individual speaking to a user based on the environment image data, receive user eye tracking image data from the user eye tracking camera, determine a pose of the user's eyes based on the user eye tracking image data, and provide feedback to the user with the feedback device based on the location of the individual speaking to the user and the pose of the user's eyes. By providing such feedback to the user, the vision-assist systems described herein assist a visually impaired user with orienting his or her gaze in the direction of a person speaking with the visually impaired user and/or assist a visually impaired user with gaining and maintaining eye contact with a person speaking with the visually impaired user. Furthermore, the vision-assist systems described herein improve and allow social interactions that are currently difficult or not possible for blind and visually impaired individuals. The vision-assist systems described herein may provide a reminder of posture and etiquette during social interactions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist system comprising:
    a processor;
    a memory module communicatively coupled to the processor;
    a user eye tracking camera communicatively coupled to the processor;
    an environment camera communicatively coupled to the processor;
    a feedback device communicatively coupled to the processor; and
    machine readable instructions stored in the memory module that cause the vision-assist system to perform at least the following when executed by the processor:
        receive environment image data from the environment camera;
        determine a location of an individual speaking to a user based on the environment image data;
        receive user eye tracking image data from the user eye tracking camera;
        determine a pose of the user's eyes based on the user eye tracking image data; and
        provide feedback to the user with the feedback device based on the location of the individual speaking to the user and the pose of the user's eyes.

2. The vision-assist system of claim 1, wherein when executed by the processor, the machine readable instructions cause the vision-assist system to:
    determine a location of the individual's eyes based on the environment image data; and
    provide feedback with the feedback device based on the location of the individual's eyes.

3. The vision-assist system of claim 1, wherein the feedback device includes a speaker, wherein when executed by the processor, the machine readable instructions cause the vision-assist system to:
    provide audible feedback to the user with the speaker based on the location of the individual speaking to the user and the pose of the user's eyes.

4. The vision-assist system of claim 1, wherein the feedback device includes a tactile feedback device, wherein when executed by the processor, the machine readable instructions cause the vision-assist system to:
    provide tactile feedback to the user with the tactile feedback device based on the location of the individual speaking to the user and the pose of the user's eyes.

5. The vision-assist system of claim 1, further comprising a microphone communicatively coupled to the processor that receives a mechanical vibration associated with sound and transforms the mechanical vibration into an electrical signal indicative of the sound, wherein when executed by the processor, the machine readable instructions cause the vision-assist system to:
    determine the location of the individual speaking to a user based on the environment image data and the electrical signal indicative of the sound.

6. The vision-assist system of claim 1, wherein when executed by the processor, the machine readable instructions cause the vision-assist system to:
    determine the location of the individual speaking to a user based on the environment image data by recognizing a moving mouth in the received environment image data.

7. The vision-assist system of claim 1, wherein when executed by the processor, the machine readable instructions cause the vision-assist system to:
    determine the location of the individual speaking to a user based on the environment image data by recognizing a face in the received environment image data using a facial recognition algorithm.

8. The vision-assist system of claim 1, further comprising an eyeglass frame, wherein:
    the user eye tracking camera is mechanically coupled to the eyeglass frame; and
    the environment camera is mechanically coupled to the eyeglass frame.

9. The vision-assist system of claim 8, wherein the feedback device is mechanically coupled to the eyeglass frame.

10. The vision-assist system of claim 8, wherein the processor is mechanically coupled to the eyeglass frame, and the feedback device is wirelessly communicatively coupled to the processor.

11. A vision-assist system comprising:
    an eyeglass module comprising:
        an eyeglass frame; and
        a user eye tracking camera mechanically coupled to the eyeglass frame;
    a processor communicatively coupled to the user eye tracking camera;
    a memory module communicatively coupled to the processor;
    an environment camera communicatively coupled to the processor;
    a feedback device communicatively coupled to the processor; and
    machine readable instructions stored in the memory module that cause the vision-assist system to perform at least the following when executed by the processor:
        receive environment image data from the environment camera;
        determine a location of an individual speaking to a user based on the environment image data;
        receive user eye tracking image data from the user eye tracking camera;
        determine a pose of the user's eyes based on the user eye tracking image data; and
        provide feedback to the user with the feedback device based on the location of the individual speaking to the user and the pose of the user's eyes.

12. The vision-assist system of claim 11, wherein:
    the processor is mechanically coupled to the eyeglass frame;
    the memory module is mechanically coupled to the eyeglass frame;
    the environment camera is mechanically coupled to the eyeglass frame; and the feedback device is mechanically coupled to the eyeglass frame.

13. The vision-assist system of claim 11, wherein:
the environment camera is mechanically coupled to the eyeglass frame;
the processor is mechanically coupled to the eyeglass frame;
the memory module is mechanically coupled to the eyeglass frame; and
the feedback device is wirelessly communicatively coupled to the eyeglass module.

14. The vision-assist system of claim 11, wherein:
the environment camera is wirelessly communicatively coupled to the eyeglass module; and
the feedback device is wirelessly communicatively coupled to the eyeglass module.

15. The vision-assist system of claim 11, wherein the feedback device includes a speaker, wherein when executed by the processor, the machine readable instructions cause the vision-assist system to:
provide audible feedback to the user with the speaker based on the location of the individual speaking to the user and the pose of the user's eyes.

16. The vision-assist system of claim 11, wherein the feedback device includes a tactile feedback device, wherein when executed by the processor, the machine readable instructions cause the vision-assist system to:
provide tactile feedback to the user with the tactile feedback device based on the location of the individual speaking to the user and the pose of the user's eyes.

17. A vision-assist system comprising:
an eyeglass module comprising:
an eyeglass frame;
a user eye tracking camera mechanically coupled to the eyeglass frame; and
an environment camera mechanically coupled to the eyeglass frame;
a processor communicatively coupled to the user eye tracking camera and communicatively coupled to the environment camera;
a memory module communicatively coupled to the processor;
a feedback device wirelessly communicatively coupled to the eyeglass module; and
machine readable instructions stored in the memory module that cause the vision-assist system to perform at least the following when executed by the processor:
receive environment image data from the environment camera;
determine a location of an individual speaking to a user based on the environment image data;
receive user eye tracking image data from the user eye tracking camera;
determine a pose of the user's eyes based on the user eye tracking image data; and
provide feedback to the user with the feedback device based on the location of the individual speaking to the user and the pose of the user's eyes.

18. The vision-assist system of claim 17, wherein the feedback device includes a speaker, wherein when executed by the processor, the machine readable instructions cause the vision-assist system to:
provide audible feedback to the user with the feedback device based on the location of the individual speaking to the user and the pose of the user's eyes.

19. The vision-assist system of claim 17, wherein the feedback device includes a tactile feedback device, wherein when executed by the processor, the machine readable instructions cause the vision-assist system to:
provide tactile feedback to the user with the tactile feedback device based on the location of the individual speaking to the user and the pose of the user's eyes.

* * * * *